United States Patent
Yu et al.

(10) Patent No.: US 7,565,531 B2
(45) Date of Patent: Jul. 21, 2009

(54) LOCKING PROGRAMMING INTERFACE

(76) Inventors: Chi-Chian Yu, 4293 Lilac Ridge Rd., San Ramon, CA (US) 94583; Tseng Jan Hsu, 1102 Hearst Dr., Pleasanton, CA (US) 94566

( * ) Notice: Subject to any disclaimer, the term of this patent is extended or adjusted under 35 U.S.C. 154(b) by 806 days.

(21) Appl. No.: 10/845,634

(22) Filed: May 13, 2004

(65) Prior Publication Data
US 2006/0026690 A1 Feb. 2, 2006

Related U.S. Application Data

(60) Provisional application No. 60/470,366, filed on May 13, 2003.

(51) Int. Cl.
*G06F 9/00* (2006.01)
(52) U.S. Cl. .................. 713/161; 713/171; 713/182; 380/44
(58) Field of Classification Search ................ 713/161, 713/171, 182; 380/44
See application file for complete search history.

(56) References Cited

U.S. PATENT DOCUMENTS

| | | | | |
|---|---|---|---|---|
| 4,459,062 A | * | 7/1984 | Siebert | ............... 403/271 |
| 4,613,901 A | * | 9/1986 | Gilhousen et al. | ........... 380/239 |
| 4,888,798 A | | 12/1989 | Earnest | |
| 5,337,357 A | | 8/1994 | Chou et al. | |
| 5,666,411 A | * | 9/1997 | McCarty | ................. 705/51 |
| 2001/0044782 A1 | | 11/2001 | Hughes et al. | |

FOREIGN PATENT DOCUMENTS

| | | |
|---|---|---|
| DE | 4019652 | 1/1992 |
| EP | 0 302 710 | 2/1989 |
| EP | 0 679 980 | 4/1995 |

* cited by examiner

*Primary Examiner*—Thomas R Peeso
(74) *Attorney, Agent, or Firm*—Craig M. Stainbrook; Stainbrook & Stainbrook, LLP

(57) ABSTRACT

A locking programming interface (LPI) which prevents piracy of device-related user software. An LPI Code is generated from a variety of different parameters, including a software product ID, a Production Key, and a number of device-specific parameters for the device that the user software supports. The LPI Code is burned into a memory of the device using a Production Utility process which utilizes the Production Key supplied by the software manufacturer. When the user software is installed in a host machine such as a user's computer system, the software performs basic device validation and then validates the LPI Code burned into the device against codes embedded into the user software.

7 Claims, 12 Drawing Sheets

FIG. 8 (Production Key Generation)

FIG. 9 (MAC Address Validation)

FIG. 10 (LPI Code Generation)

FIG. 11  (Decode/Validate)

LOCKING PROGRAMMING INTERFACE

This application claims priority from Provisional Application 60/470,366, filed on May 13, 2003.

FIELD OF THE INVENTION

The present invention relates to digital security. More particularly, the present invention is directed to software and hardware digital security methods for limiting the risk of piracy.

BACKGROUND

Software piracy is a growing problem. There are two types of piracy, one by retail users of software and the other by manufacturers/distributors and other entities that bundle or pre-install software. Traditional schemes to ward off such piracy include the use of key codes or serial numbers. The serial number is often physically printed on the media (such as a Compact Disc) on which the software is being distributed. When installing or activating the software for use, this serial number must be input by the user in order for the software to function. However, in such schemes, serial numbers which are only printed on the disc or on packaging can be shared or distributed to a wide number of unauthorized users. When such unauthorized users obtain a copy of the software, it can be activated for functional use by entering the stolen serial number.

Another protection in the form of keys is slightly different, in that keys are embedded in binary form into a compact disc such that the original disc or an exact copy thereof is required. The software program when installing or activating searches for this key in order to function, thereby removing the user from the authorization process. However, it is now common for any such software to be hacked by the use of key generation software. Key generation software includes software which generates the necessary key from examining the software itself. This allows even a non disc-to-disc copy, such as an Internet distributed copy, of the software to used by unauthorized users. Worse yet, both schemes of keys and serial numbers do not prevent device vendors, distributors or others to install/make multiple copies of the software in multiple devices while only paying for one or very few copies or licenses.

Due to such deficiencies, software makers sometimes require activation by remote keying such as over the Internet so that a central depository of software serial numbers/keys is maintained by the software maker. This would prevent duplicate keys or serial numbers from being entered because a match could then be performed. Such remote activation allows only a single use of a given key or serial number so that if copied or installed in other devices, the unauthorized copy of the software will not functional, or will function in only limited ways or over a limited period. However, such a scheme is primarily of use in preventing unauthorized retail use and does not address the vendor/distributor problem. Such a scheme employed at that level would be so cumbersome as to be impractical.

In the case of device vendors, distributors, VARs (Value Added Resellers) and like entities, software is often provided in batches or lots, such that the entity orders thousands of copies or pays for the licensing fees to thousands of copies of the software at one time. However, for the software maker, after this first set is sold, it is impossible to determine what happens in subsequent instances. For instance, an entity could buy ten thousand copies (or pay licensing fees to use the same copy ten thousand times) and make unpaid-for use of the next forty thousand copies. This leaves the software maker with less revenue than they should have had.

This is particularly problematic when a software manufacturer produces software intended to be bundled with a third party device. Since the bundling is not controlled by the software manufacturer, there has been a need for a mechanism which will prevent unauthorized duplication of software that is to be bundled with devices. Since the device production is by a third party, and not the software manufacturer, there is currently little or no effective control over the bundling.

SUMMARY

The present invention comprises, among its various embodiments, methods and systems for a locking programming interface (the "LPI") which helps to prevent piracy of device-related user software. In an exemplary arrangement, an LPI Code is generated from among a variety of different parameters, including, for example, a software product ID, a Production Key, and a number of device-specific parameters for the device that the user software supports. The LPI Code is burned into a memory of the device using a Production Utility process which utilizes a Production Key which may, for example, be supplied or authorized by the software manufacturer. When the user software is installed in a host machine such as a user's computer system, the software performs basic device validation (such as, for example, MAC address validation) and then validates the LPI Code burned into the device against codes embedded into the user software.

DETAILED DESCRIPTION

Figure 1:
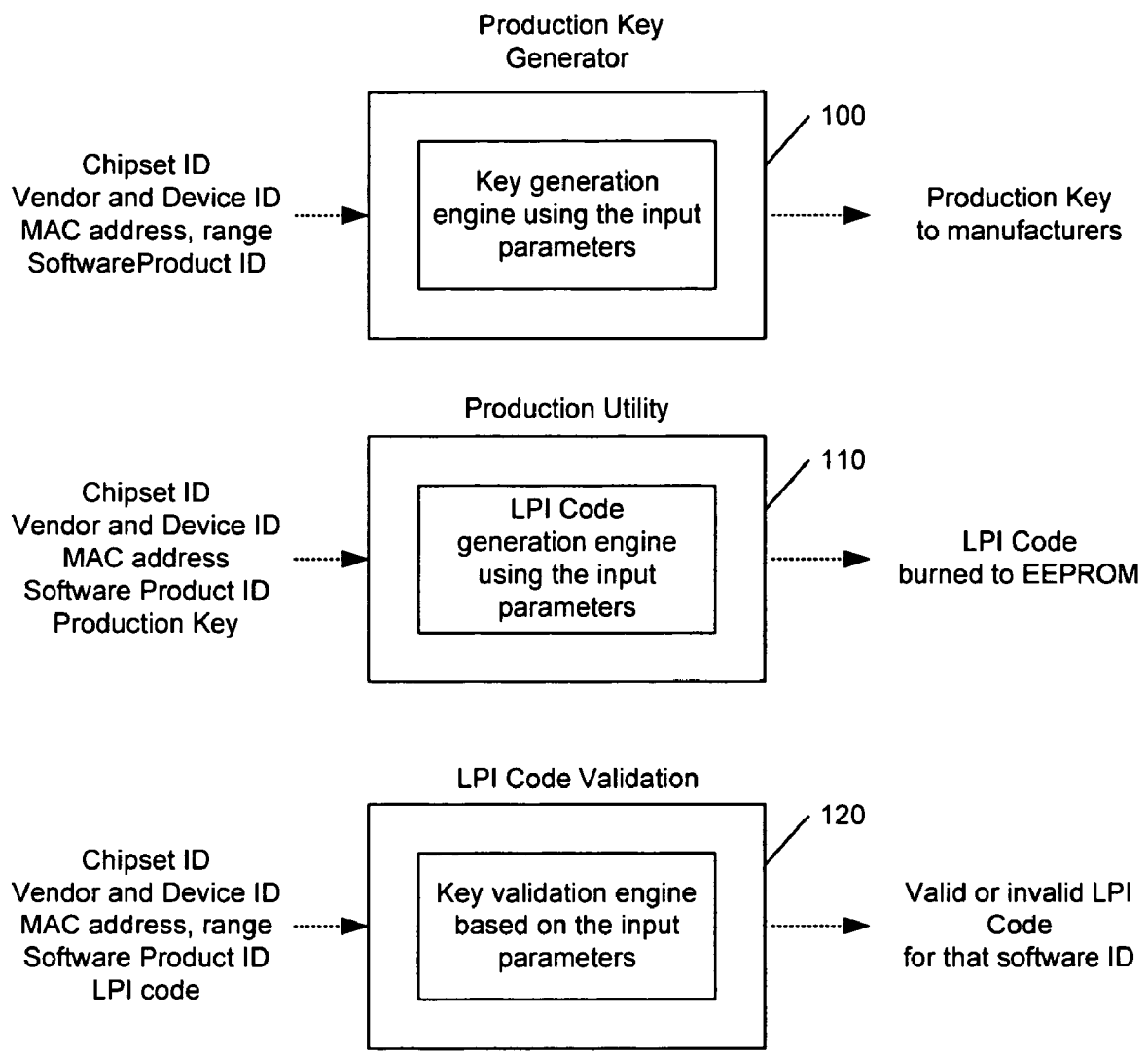
FIG. 1 illustrates one exemplary implementation of the locking programming interface of the present invention.

In accordance with an exemplary embodiment of the invention, the locking programming interface is illustrated conceptually in FIG. 1. The exemplary locking programming interface is intended to prevent a device manufacturer from bundling, with the device manufacturer's product, unauthorized (unpaid for) copies of software that are sourced from a third party software manufacturer but intended to be used with the device manufacturer's device. A source-end Production Key generation process 100 is controlled by the manufacturer of the software. This process 100 includes providing the software manufacturer with one or more of a group of parameters associated with the device which will be bundled with the software. These various identifiers, which are preferably device-specific, can include chipset ID, vendor ID, device ID and any other parameter which permits an association with the particular device. Where appropriate, additional identifiers such as a MAC (Media Access Control) address and MAC address range may be provided as additional input to the Production Key process 100. In one arrangement, the MAC address indicates the starting MAC address and the range gives the number of units that will be produced starting with that number address. Also provided as input is a software product ID which identifies which copy of the software is intended for distribution with that device. Using these input parameters, the software manufacturer initiates a Production Key generator engine that generates a production key and supplies this to the device manufacturers. In one arrangement, the Production Key generation process 100 can be controlled entirely by or on behalf of the software manufacturer and its internal workings are kept in confidence from device manufacturers, although it is apparent that, in other embodiments, it may be desirable to disclose certain aspects of the process to, for example, allow for substitution of defective goods. In addition, for some embodiments of the invention, a "Batch" Key can be substituted for the Production Key, where the Batch Key applies to multiple copies of the software which are being bundled with multiple devices. This eases the burden of having to produce an individual Production Key for every device and software being bundled.

In an exemplary arrangement, once the Production Key is supplied to the device manufacturer, a further Production Utility process 110 is undertaken. Production Utility process 110 utilizes a special production utility software provided by the software manufacturer in order to encode a locking programming interface code directly onto the device(s) being manufactured. According to process 110, device parameters such as the chipset ID, vendor and device IDs, software product ID, or other parameters, and, if applicable, the MAC address and range are supplied to the production utility software. The production key generated and supplied by the software manufacturer is also input to the production utility software. Using at some or all of these as input, the production utility software generates locking programming interface (LPI) code which, in one embodiment of the invention, may be four bytes in length although it will be appreciated that other sizes are also acceptable. According to process 110, the production utility software writes the generated LPI code to a ROM (Read Only Memory) device such as an EEPROM (Electrically Erasable Programmable Read Only Memory) which is on the device being manufactured. Once the EEPROM is loaded with the LPI code, the device can eventually be shipped to customers for eventual use with the bundled or otherwise associated software.

After a customer installs or connects up the device, software can be purchased (or may accompany the device as a bundle) from the software manufacturer who provided the Production Key and Production Utility software. In either case, whether by bundling or via direct distribution, an LPI Code Validation process 120 is undertaken to ensure that an authorized relationship exists between the device and the software being distributed. LPI Code Validation process 120 takes as input one of more of the following parameters: chipset ID, vendor ID, device ID, MAC address and software product ID as well as the LPI code burned into the EEPROM of the installed/connected device. In an exemplary arrangement, the appropriate ones of these input parameters can be read directly from the installed/connected device via the operating system (through an API, for instance) without any intervention or input by the user/installer of the device/software. A key validation engine, which is part of the distributed software will validate the LPI code of the device with all of the parameters of the device and the software ID. In such an arrangement, a particular software copy is judged valid or invalid based upon this validation test for the installed/connected device.

Figure 2:
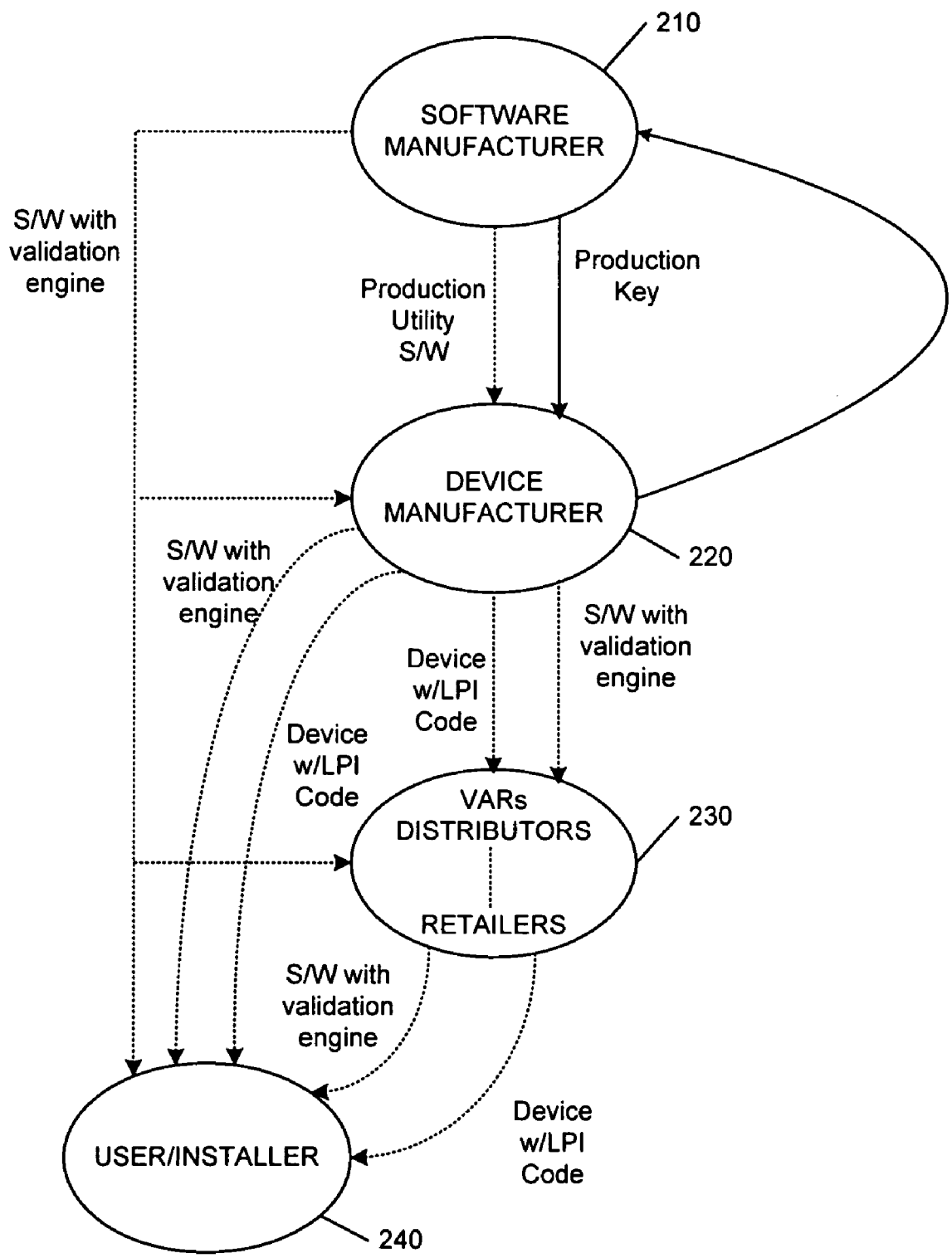
FIG. 2 is an entity diagram further illustrating an exemplary locking programming interface process.

This three stage copy protection process aims to ensure that along the manufacturing/distribution/retail channeling of the software, there is limited opportunity to use unauthorized copies of the software. FIG. 2 is an entity diagram further illustrating this process.

A software manufacturer 210 is an entity that produces utility or application software for a device, such as a network interface card, that is to be manufactured by a device manufacturer 220. In a typical arrangement, the software manufacturer 210 and the device manufacturer 220 are separate entities in the sense that the device manufacturer is paying for a license or purchasing copies from the software manufacturer 210. Thus, they could separate companies or operating units of the same company. The device manufacturer 220 provides the chipset ID, device ID, vendor ID and, if applicable, the MAC address and/or MAC address range to the software manufacturer 210. The software manufacturer 210 utilizes a software ID in conjunction with these parameters and generates a production key. The software manufacturer 210 provides a Production Key utility software to the device manufacturer 220. The device manufacturer 220 runs the Production utility software which takes the Production Key along with other parameters, including the software ID, and generates a LPI code. The LPI code is written directly onto the device memory by the Production utility software as mentioned above.

The device manufacturer 220 is then free to sell the device with the embedded LPI to an intermediary 230 such as a VAR (Value Added Reseller), distributor, or retailer. In one embodiment, the software manufactured by the software manufacturer 210 is sent to the device manufacturer so that the software can be bundled with that device. In other embodiments, the software independently may be sent to the user/installer 240 directly or through a intermediary 230. The software may be sent either in the form of computer readable media such as floppy disk, CD-ROM, etc. or as a downloadable file/set of files via a wired/wireless network connection.

Ordinarily, though, the device manufacturer 220 will bundle the software, which contains a validation code, with the device containing the corresponding LPI code, and sell this bundled product either directly to user/installer 240 or through an intermediary 230. When user/installer installs the device with the LPI code, the corresponding software, which contains its own validation engine, will have to be validated prior to functional use. This validation is performed automatically upon attempted install, without human intervention. If the validation test proves successful, the user/installer 240 can then continue using the software.

The Production Key, Production Utility software, software ID and validation engine are all provided by the software manufacturer 210. The other entities 220, 230, and 240 do not have the ability to affect these once they are provided by the software manufacturer 210. For instance, the validation engine takes inputs transparent to the user/installer 240. The Production Utility software writes the LPI code directly to the memory of the device. The Production key is generated and provided by the software manufacturer 210.

Figure 3:
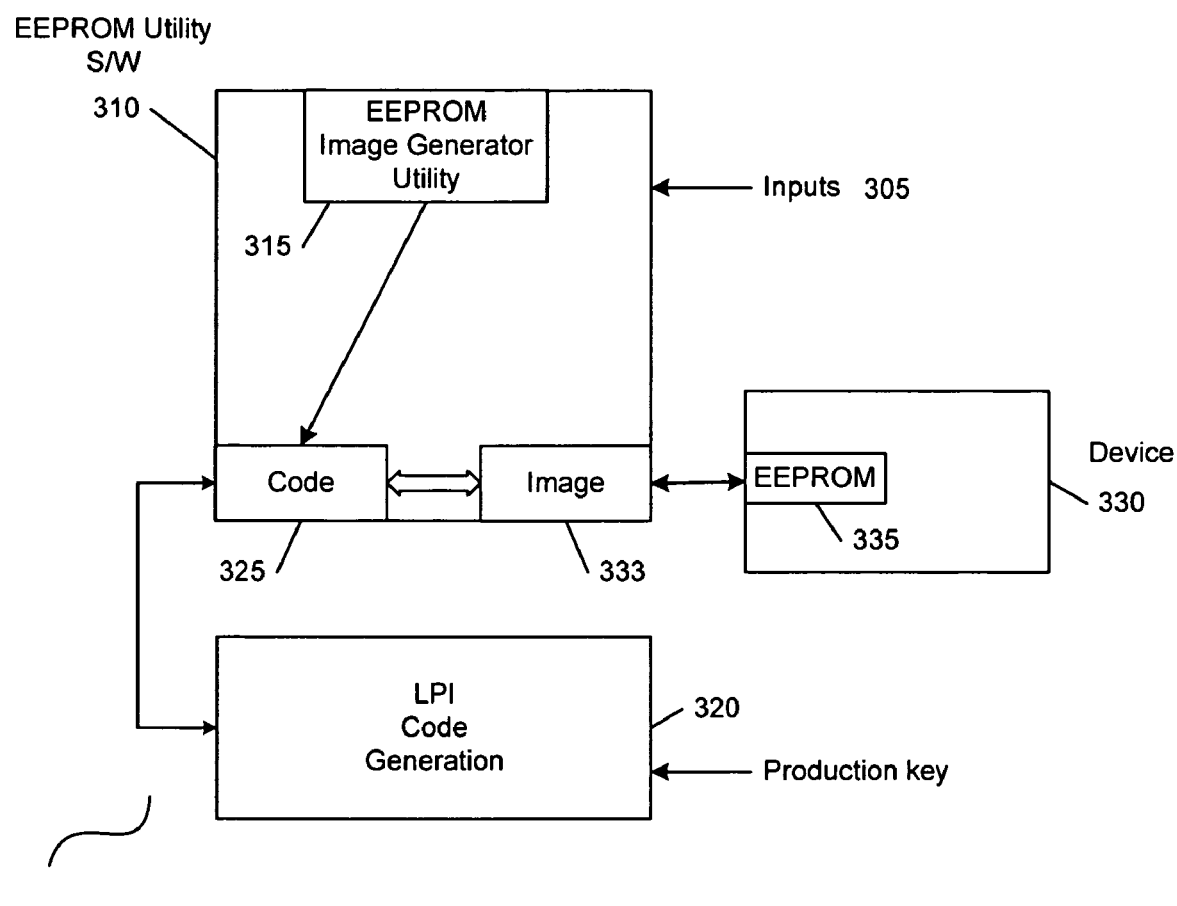
FIG. 3 illustrates a Production Utility software according to at least one embodiment of the invention.

FIG. 3 illustrates a Production Utility software according to at least one embodiment of the invention. The Production utility software 300 contains several components which interact with each other. Inputs 305 are utilized by an LPI Code Generation component 320 in order to generate the LPI code. The inputs 305 include device-specific parameters such as device ID, chipset ID, etc. and the Software ID and Production Key. LPI Code Generation component 320 may be in form of a code library which as discussed below, can be accessed by a processor and executed to carry LPI Code generation. An EEPROM image generation utility generates an image 333 from code 325 that can be written to the EEPROM 335 of device 330. The EEPROM image, in one embodiment of the invention, is a binary file/data set containing the MAC Address, device ID and other device-specific parameters which will be written (programmed) to the EEPROM in the latter/final stages of the production process.

Figure 4:
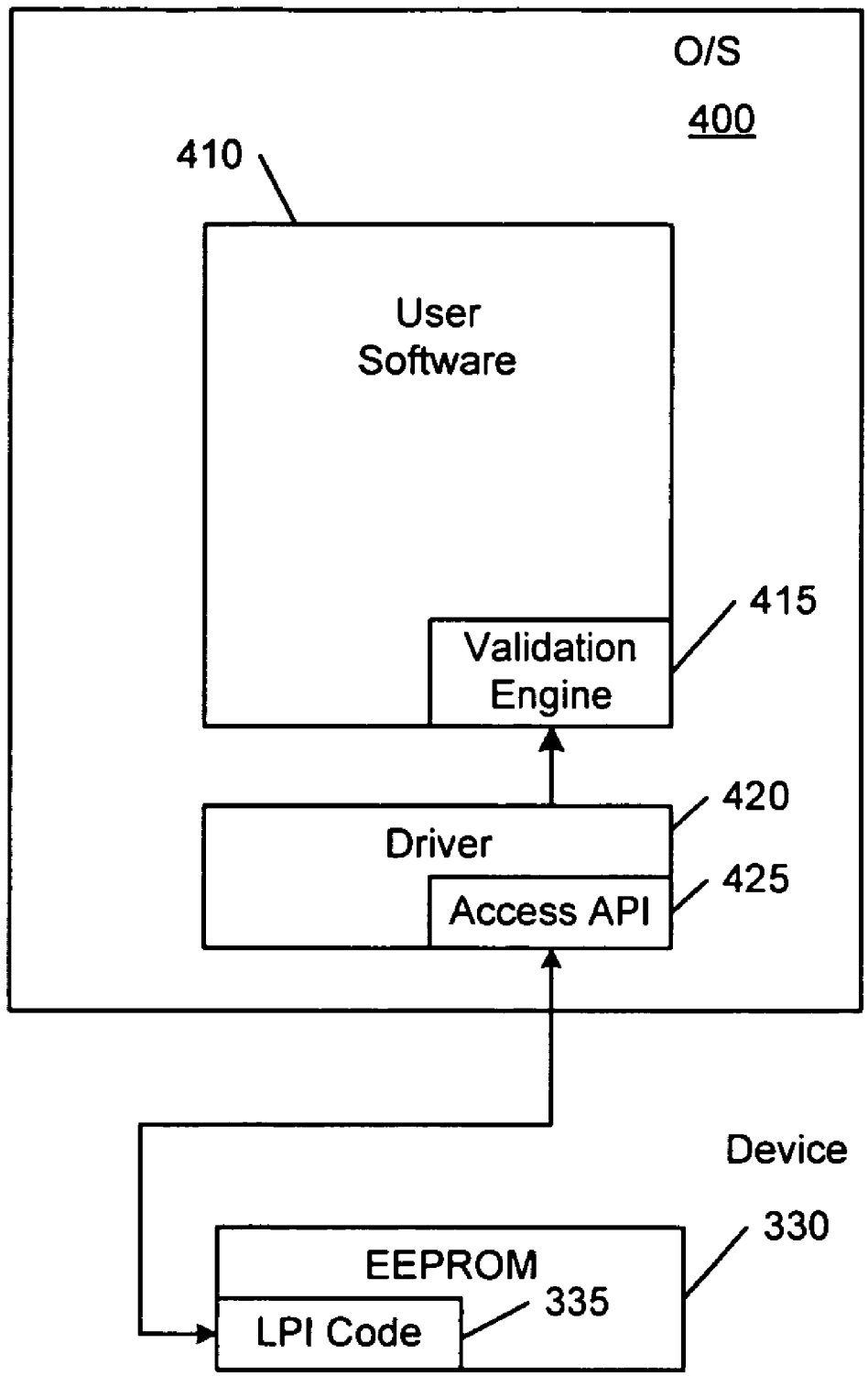
FIG. 4 illustrates user software and validation according to at least one embodiment of the invention.

FIG. 4 illustrates user software and validation according to at least one embodiment of the invention. User software 410 which includes a validation engine 415 can be installed into a host device (such as a personal computer) that runs on some operating environment or operating system (O/S) 400 such as Windows™ (a product of Microsoft Corporation). Software 410 is loaded by the O/S 400 through a readable media (such as CD-ROM) or downloaded via a network connection such as to the Internet. Also loaded into the O/S 400 (either independently, or with the installation of device 330) is a driver 420 which includes an API 425 for accessing the EEPROM 335 of device 300. As shown in FIG. 3, and described above, the EEPROM 335 contains the burned-in LPI code generated during production of device 330. The API 425 extracts the LPI code from the EEPROM 335 and makes it available to validation engine 415.

In some embodiments of the invention, the user software 410 will upon be loaded over the O/S 400 initiate a basic validation scheme (see FIG. 6, and associated description, below) to ensure the device 330 is properly installed (and of the proper type). After basic validation, the validation engine 415 will retrieve all of the device parameters (through the driver 420) as well as the LPI code and validate the LPI code using the device parameters and software product ID (which is embedded in the software). If the LPI is validated, then the user software 410 is enabled to operate normally. If not, the user software 410 is disabled.

Figure 5:
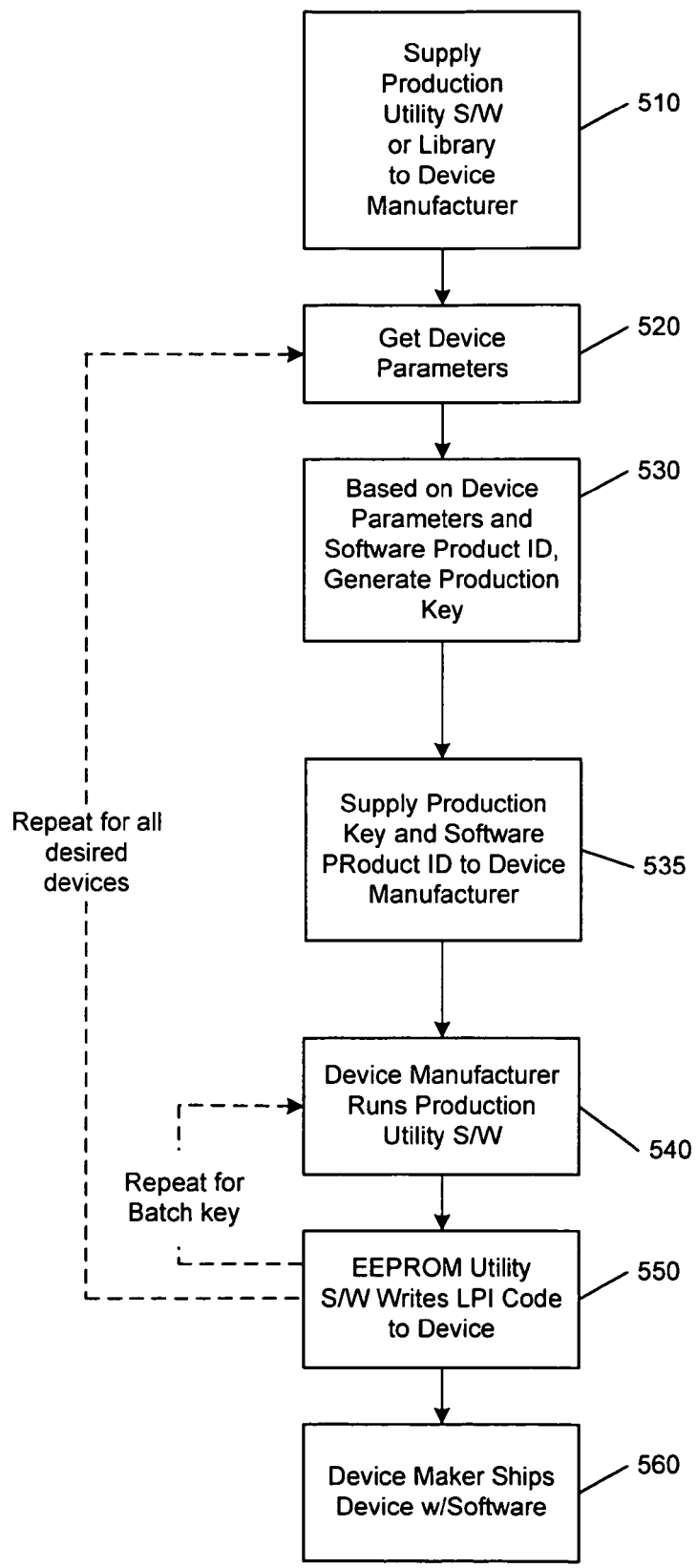
FIG. 5 illustrates a flowchart of the device production process as it relates to software bundling according to at least one embodiment of the invention.

FIG. 5 illustrates a flowchart of the device production process as it relates to software bundling according to at least one embodiment of the invention. According to block 510, a Production Utility software (and/or related library) is supplied by the manufacturer of the user software to the device manufacturer. Once supplied the Production Utility software is reused for all device production routines. According to block 520, the manufacturer of the user software obtains, either manually, or in automated fashion, the device-specific parameters of the device (or batch of devices) which the user software is intended to support. According to block 530, based on these device parameters and a software manufacturer issued software product ID, a Production Key is generated. The Production Key and Software Product ID is then supplied to the device manufacturer according to block 535. The device manufacturer runs the Production Utility software (block 540) with these supplied inputs. The Production Utility software uses these supplied inputs as well as the device specific parameters (which it can obtain from the device directly, or otherwise) and writes an LPI code (which is generated therefrom) to the device (block 550). The device manufacturer can then ship the completed device (block 560) with bundled software or without, based upon the business model.

The blocks 520 through 550 are repeated for every device for which the manufacturer has paid a license or purchased. In other embodiments of the invention, an entire batch of devices and copies of the user software can be readied using a Batch key. The Batch key is merely the same as the Production key in content but would be repeated for the number of units in the batch, as specified by a MAC address range and starting address, if provided. For instance, if 10,000 devices need to be shipped, the same software ID and Batch key can be supplied to the device manufacturer so that they do not have obtain a separate Production Key and Software Product ID for each device. This can be achieved through a serially arranged or ranged device parameter such as a MAC address range for the devices. In such cases, the Production Utility software could be placed into a batch mode where it merely replicates the LPI for the number of times specified by the size of the batch (for instance 10,000). If a Batch key is used, then only steps 540 and 550 need to be repeatedly performed, once for each unit of the batch.

In other embodiments of the invention, where the user of the user software can upgrade the version thereof by use of an e-commerce or other semi-automated mechanism, blocks 520 to 540 would be repeated for each copy. These trial or other versions of the software would then allow for upgrade to a full version of the software, as discussed below.

Figure 6:
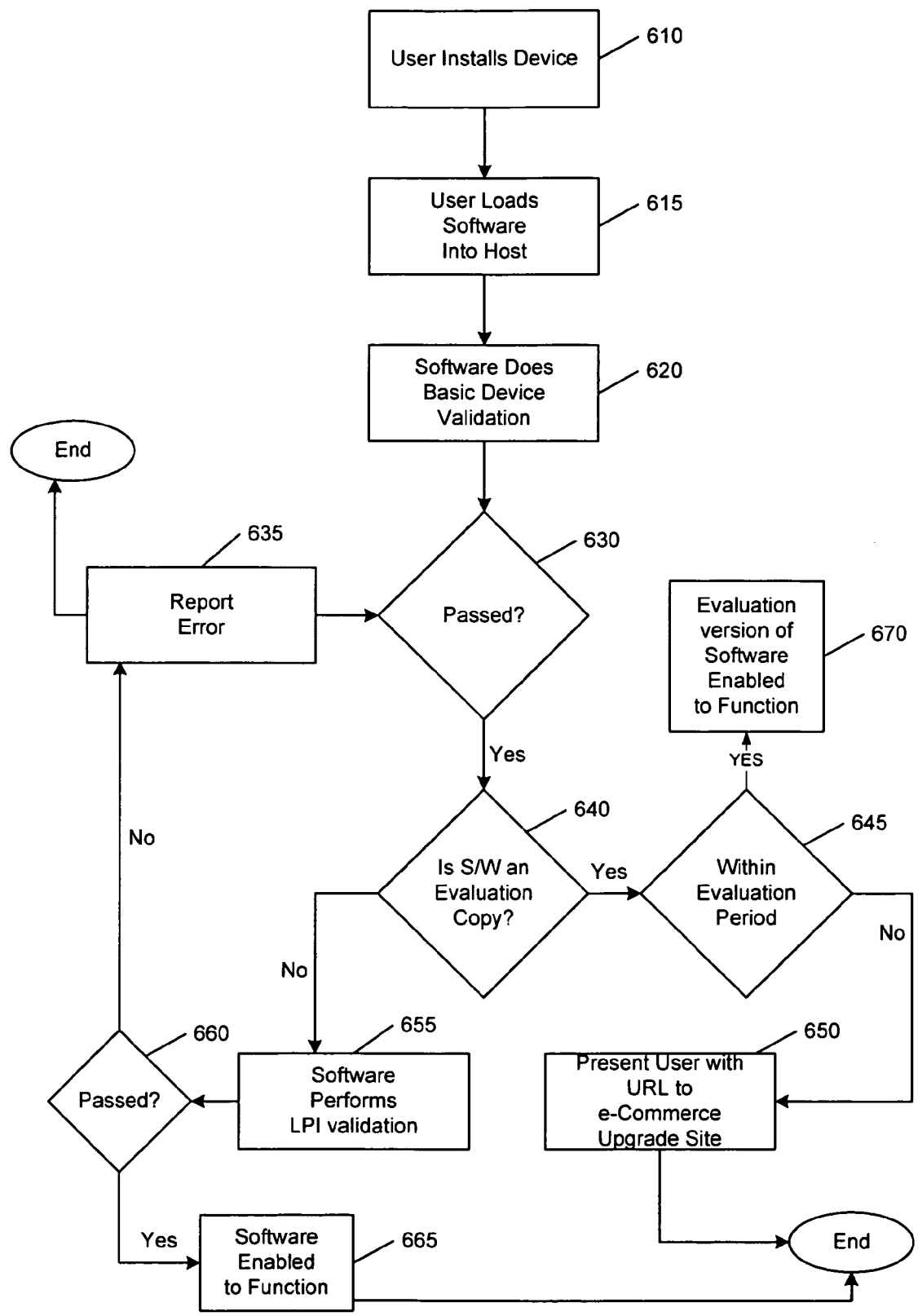
FIG. 6 illustrates the user installation and software/device validation process according to at least one embodiment of the invention.

FIG. 6 illustrates the user installation and software/device validation process according to at least one embodiment of the invention. First, the user installs the device (block 610). This step may have already been performed in the case of devices which come pre-installed as part of a larger system build or rollout. The user then loads the user software into the host machine in which the device operates (block 615). In some embodiments of the invention, the user software performs basic device validation making sure the right brand/model of device has been installed (block 620). This validation may simply look at a device ID, vendor ID or other parameter and make sure it appears to be a valid one. The basic validation may also look to see if a proper device driver is installed in the operating system. If the basic validation fails (checked at block 630) then the error is reported (block 635).

If the basic validation passes (checked at block 630), then, in some embodiments of the invention, a check to see if the loaded software is an evaluation copy is performed (block 640). If the software is an evaluation copy, then a further check is made to see if it is still within the evaluation period (block 645). If not, present the user with a URL which allows the user to click it, leading to an upgrade page (block 650). The upgrade page can, for instance, enable the user to pay and obtain a full version of the software. If it is within the evaluation period, then the evaluation version of the software is enabled to function (block 670). If the software is not an evaluation copy, then the user software performs the LPI validation (code checking) using its built-in validation engine (block 655). If the validation returns a successful result (checked at block 660), then the software is enabled to function as it normally would. If not, then the error is reported (block 665) and the software remains disabled for any functional use.

Figure 7:
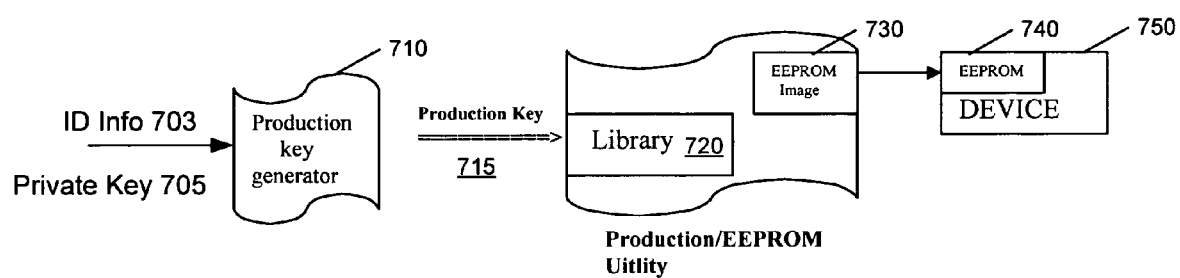
FIG. 7 illustrates an exemplary LPI Code generation and encoding process.

FIG. 7 illustrates at least one embodiment of an LPI Code generation and encoding. The Production Key encoder 710 is a device/software that the software manufacturer uses to generate a Production Key 715 for a given device manufacturer and their devices. Production Key encoder 710, in one embodiment, takes ID information 703 and embeds with a private key 705. ID information 703 includes information such as device ID, vendor ID, Mac Address start and range, and can also include the chipset ID and software product ID.

The Private Key 705 in one embodiment is 2 bytes in length and held in confidence by the software manufacturer. In this embodiment, the Production Key 715 can be flexible enough to accommodate Mac address validation for any MAC address within the range given. The same Production Key can be used for any MAC address in the range, making this like a Batch key. One methodology for generating Production Key 715 is discussed below and shown with respect to FIG. 8.

The Production Key 715 is sent to the device manufacturer to be used with the Production Utility software provided them. In one embodiment of the invention, the Production Utility software includes an LPI Library interface 720 which generates the raw LPI code. The LPI code is input to the EEPROM Image utility 730 so that it can be written to the EEPROM 740 of device 750.

Figure 9:
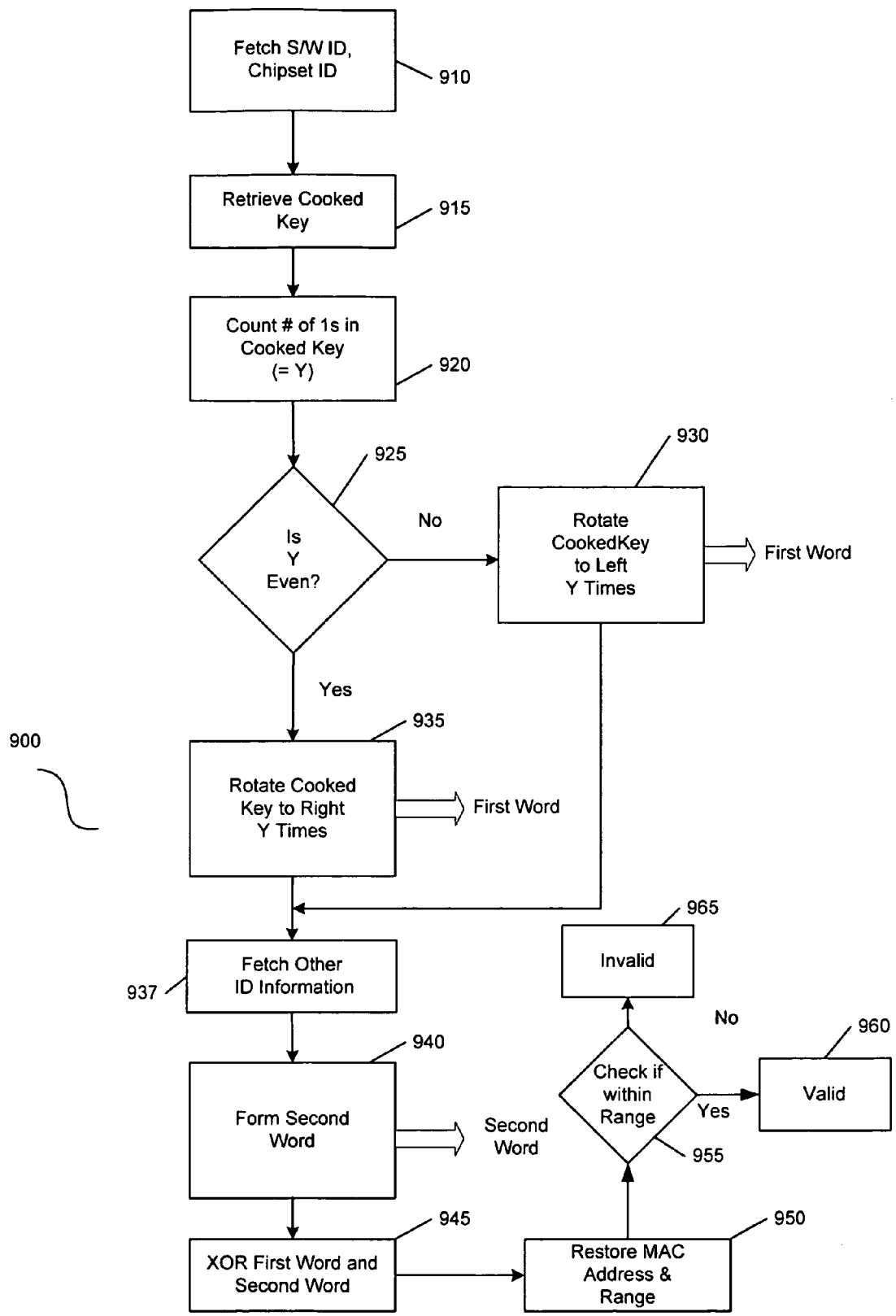
FIG. 9 illustrates basic MAC address validation according to at least one embodiment of the invention.
Figure 10:
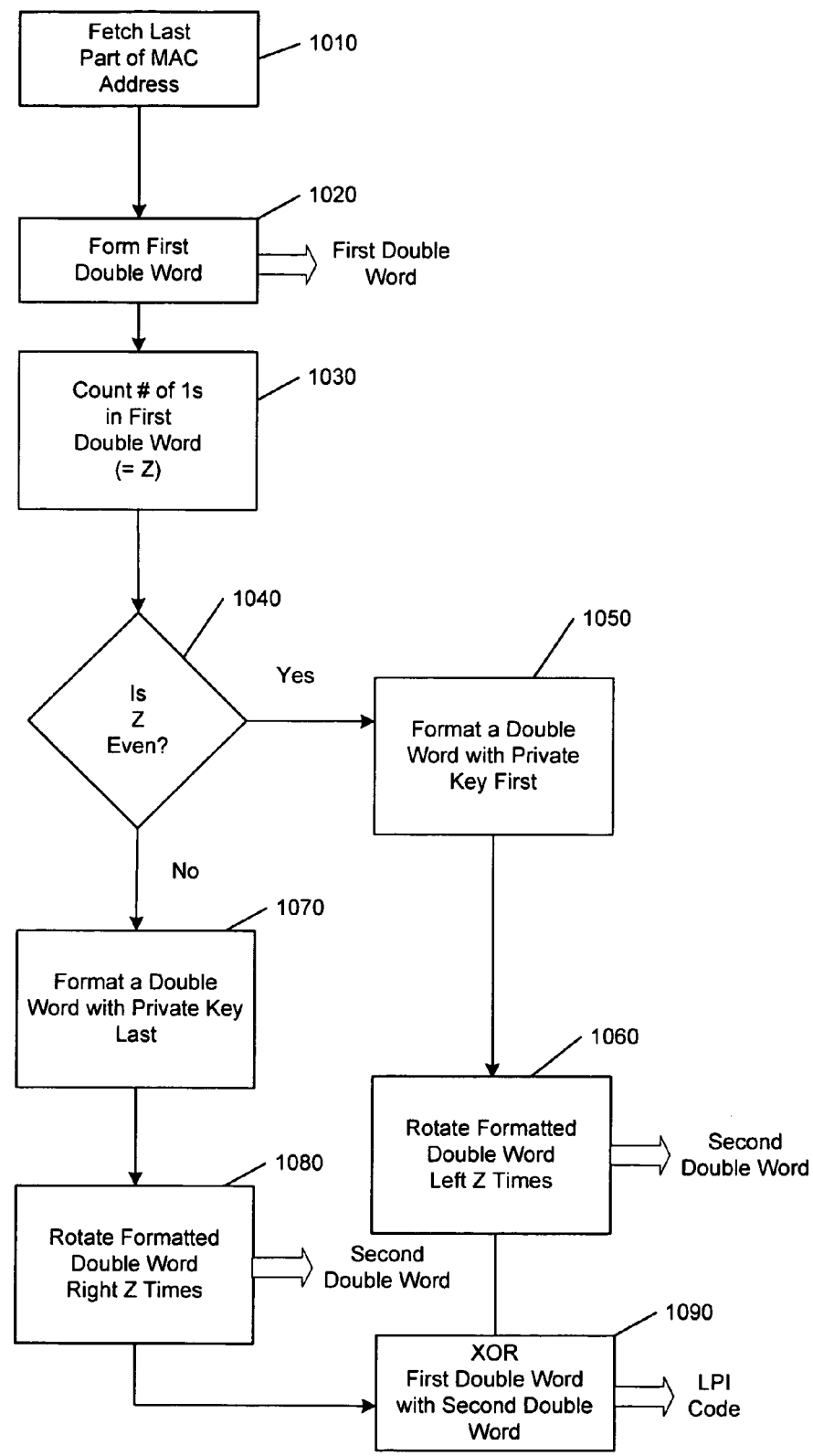
FIG. 10 illustrates LPI code generation according to at least one embodiment of the invention.

LPI library 720 is a software library that consists of two functions. The first is basic MAC address validation which validates the MAC address of the device being manufactured (or for which an LPI code is sought) against the acceptable range of MAC addresses as encoded in the Production Key. One embodiment for basic MAC address validation is shown in FIG. 9 and described below. The other key function of the LPI Library 720 is to generate an LPI code that will then be burned into the device being manufactured. One embodiment for generating an LPI code is shown in FIG. 10 and described below. The LPI Library 720 is designed such that it can be integrated with EEPROM tools that the manufacturer may have.

Figure 8:
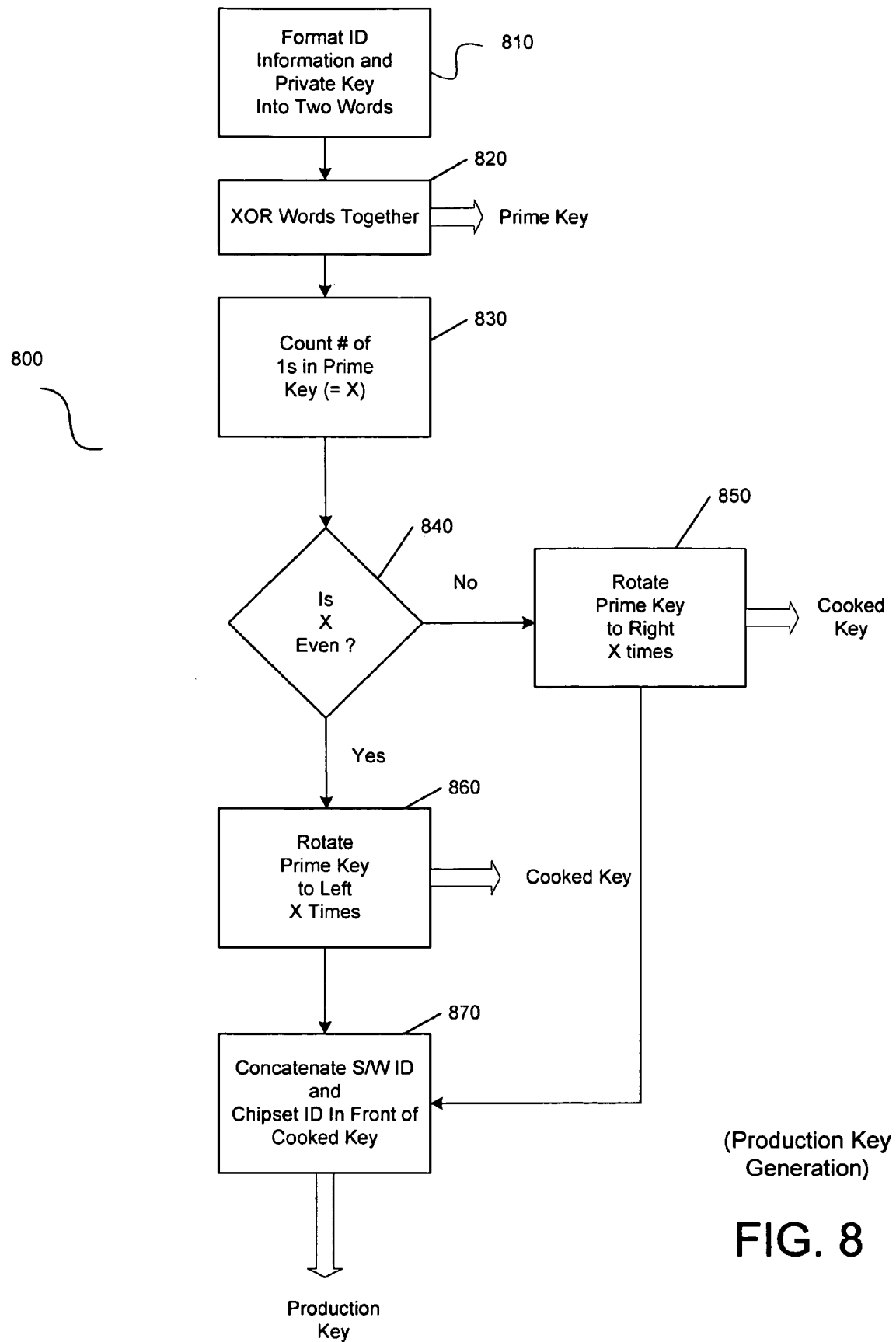
FIG. 8 illustrates Production Key generation according to at least one embodiment of the invention.

FIG. 8 illustrates Production Key generation according to at least one embodiment of the invention. The ID information 703 discussed above includes a number of fields. In this embodiment of the invention, these include:

Device ID: 2 bytes
Vendor ID: 2 bytes
Mac Address: 6 bytes
Address Range: 2 bytes, the range will start form 16→to save for the bits usage.
Chipset ID: 4 bits
Software ID: 4 bits According to process 800, the ID information and Private Key are formatted (arranged) into two separate words of equal length (block 810). In one embodiment of the invention, using the ID information as shown above, this arrangement is as shown below:

| Formatted Word 1 | | | |
|---|---|---|---|
| Mac Starting Address (6 bytes) | | | Range (2 bytes) |
| Formatted Word 2 | | | |
| Private Key (2 bytes) | S/W ID & Chipset ID (2 bytes) | Device ID (2 bytes) | Vendor ID (2 bytes) |

Next, according to block 820 the Formatted Word 1 and Formatted Word 2 are "XORed together" (have the exclusive OR operation performed on them) which results in the Prime Key, which in the embodiment shown, would be 8 bytes (block 820). Next, the number of 1s in the Prime Key (expressed as a binary number) is counted and this count is stored in a variable X (block 830).

A Cooked Key is generated depending upon whether X is even or odd (checked at block 840). If X is not even (i.e. odd), then the Prime Key is rotated X times to the right (block 850). This becomes the Cooked Key. If X is even, however, then the Prime Key is rotated X times to the left (block 860) and this becomes the Cooked Key. The Software ID and Chipset ID are concatenated in front of the Prime Key and this forms the Production Key (block 870).

FIG. 9 illustrates basic MAC address validation according to at least one embodiment of the invention. Process 900 starts off by fetching the software ID and chipset ID from the most significant part (front) of the Production Key (block 910). Next, the Cooked Key is retrieved (block 915) from the remainder of the Production Key.

Next, the number of 1s in the Prime Key (expressed as a binary number) is counted and this count is stored in a variable Y (block 920). A First Retrieved Word is generated depending upon whether Y is even or odd (checked at block 925). If Y is not even (i.e. odd), then the Cooked Key is rotated Y times to the left (block 930). This becomes the First Retrieved Word. If Y is even, however, then the Cooked Key is rotated Y times to the right (block 935) and this becomes the First Retrieved Word. Next other ID information is fetched such as Device ID and Vendor ID (either manually or directly from the device) (block 937). Next, the Second Retrieved Word is formed based on the device ID information, software ID, chipset ID, and the Private Key information (block 940). The Private Key is retrieved directly from the LPI Library. One format for the Second Retrieved Word is as follows:

Second Retrieved Word

| Private Key (2 bytes) | S/W ID & Chipset ID (2 bytes) | Device ID (2 bytes) | Vendor ID (2 bytes) |
|---|---|---|---|

Next, according to block 945, the First Retrieved Word and the Second Retrieved Word are XORed together. This will restore the valid MAC starting address and range (block 950). Next, the MAC address of the device is compared to see if it is within the restored range (block 955). If so, the MAC address is valid (960). If not, the MAC address is invalid (block 965).

FIG. 10 illustrates LPI code generation according to at least one embodiment of the invention. Process 1000 starts off by fetching the last part (e.g. the last four bytes) of the MAC address (block 1010). The forms the First Double Word (block 1020).

Next, the number of 1s in the First Double Word (expressed as a binary number) is counted and this count is stored in a variable Z (block 1030). A Second Double Word is generated depending upon whether Z is even or odd (checked at block 1040). If Z is even, then an Intermediate Double Word is formed with the Private Key in the front (block 1050).

This is as shown below:

Intermediate Double Word (Z is Even)

| Private Key (2 bytes) | S/W ID & Chipset ID (2 bytes) |
|---|---|

If Z is even, then the Intermediate Double Word, so formed, is rotated to the left Z times (block 1060) to yield the Second Double Word. If Z is not even (i.e. odd), then an Intermediate Double Word is formed with the Private Key in the back (block 1070).

This is as shown below:
Intermediate Double Word (Z is Odd)

| Private Key (2 bytes) | S/W ID & Chipset ID (2 bytes) |
|---|---|

If Z is odd, then the Intermediate Double Word, so formed, is rotated to the right Z times (block 1080) to yield the Second Double Word. The First Double Word and Second Double Word are XORed together to form the LPI code (block 1090).

Figure 11:
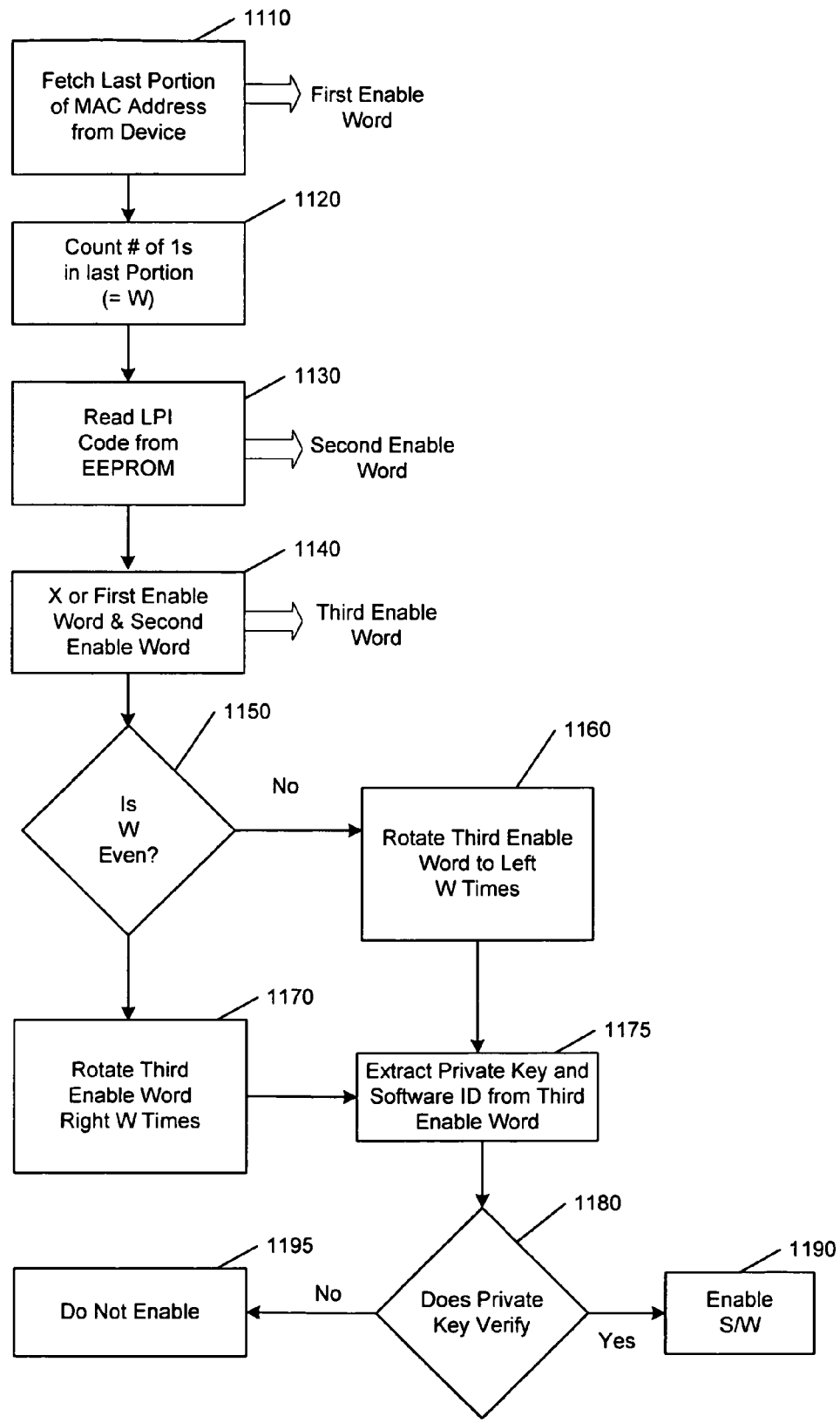
FIG. 11 illustrates Software validation and enabling according to at least one embodiment of the invention.

FIG. 11 illustrates Software validation and enabling according to at least one embodiment of the invention. Process 1100 assumes that the device for which software is being enabled has been physically/logically installed into the host or system. Process 1100 starts off by fetching the last portion of the MAC address directly from the device (block 1110). This will constitute the First Enable Word.

Next, the number of 1s in this last portion of the MAC Address (e.g. the last 4 bytes) is counted and this count is stored in a variable W (block 1120). Then, the LPI code which is burned into the device is read directly from the EEPROM of the device (block 1130). The LPI which is read constitutes a Second Enable Word. Then, according to block 1140, the First Enable Word and the Second Enable Word are XORed together to make the Third Enable Word.

A check is made to see if W (the number of 1s in the last portion of the MAC address) is even or odd (block 1150). If W is not even (i.e. odd), then the Third Enable Word is rotated W times to the left (block 1160). If W is even, however, then the Third Enable Word is rotated W times to the right (block 1170). The rotated version of the Third Enable Word will contain a Software ID, Chipset ID and Private Key. This Private Key is extracted from the rotated Third Enable Word (block 1175). The extracted Private Key is verified against the true Private Key which is built-in or encoded in the user software (block 1180). If the extracted Private Key verifies, then the user software or certain software features (as determined by the Software ID) are enabled (1190). If not, the user software is not enabled (block 1195) and thus, cannot function.

Figure 12:
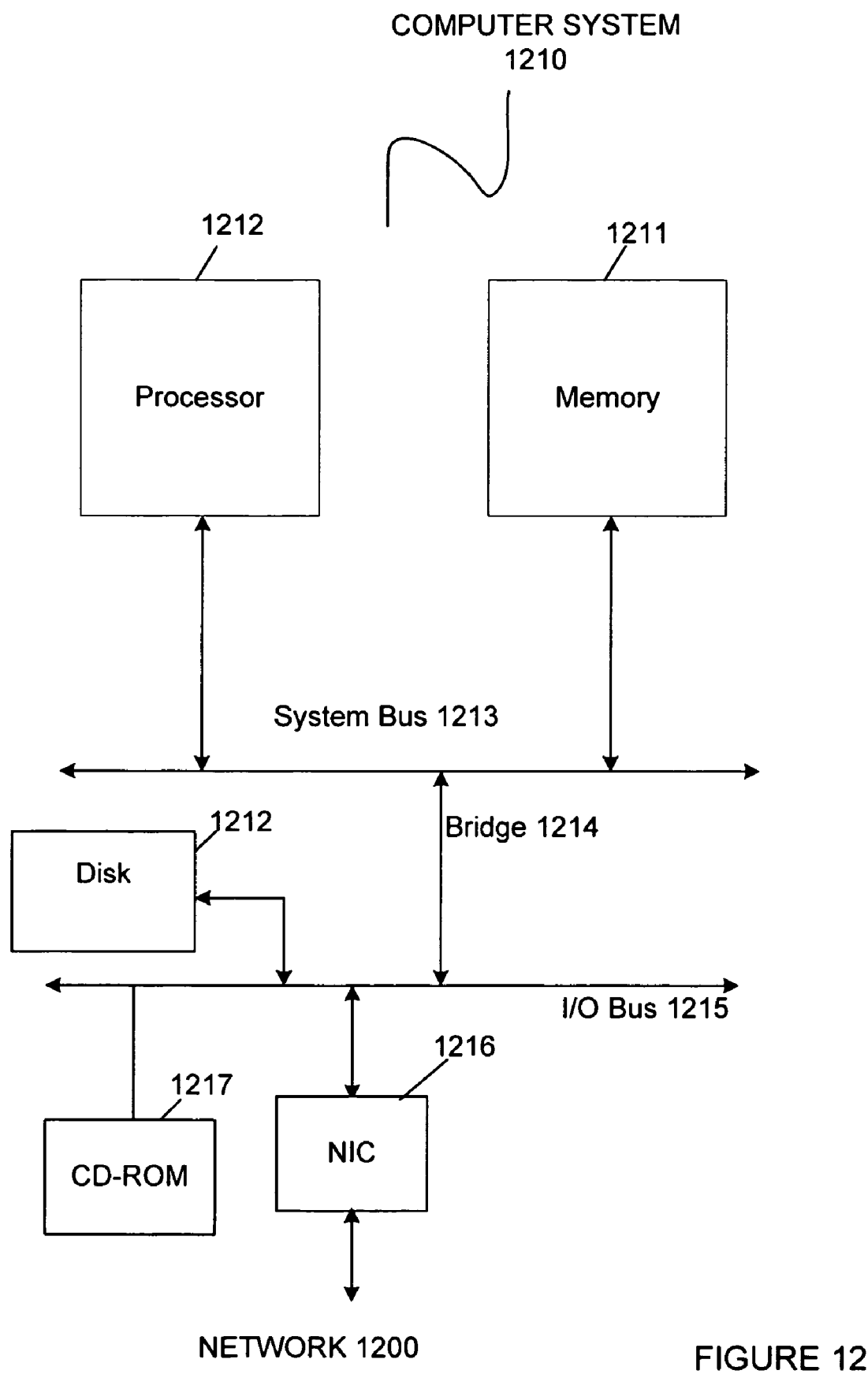
FIG. 12 illustrates a computer system which is capable of implementing one or more embodiments of the invention.

FIG. 12 illustrates a computer system which is capable of implementing one or more embodiments of the invention. Illustrated is a computer system 1210, which may be any general or special purpose computing or data processing machine such as a PC (personal computer) which can optionally be coupled to a network 1200. The invention, as defined above in various embodiments, is a software piracy protection scheme for a user software which is designed to operate with a device attached to a system such as, for example, a Network Interface Card (NIC) 1216 or other peripheral which permits a unique association with the software.

The user software is protected in a three stage process which involves the use of a Production Utility Software and/or LPI code library (in some embodiments). One of ordinary skill in the art may write/design program code designed for computer system 1210 which implements the functions of the user software and Production Utility software or any of the methods/processes set forth in various embodiments of the invention. Such program code may be executed using a processor 1212 such as CPU (Central Processing Unit) and a memory 1211, such as RAM (Random Access Memory), which is used to store/load instructions, addresses and result data as needed. The executable program code used to perform the user software, Production Utility software, LPI code library and so on may derive from an executable compiled from source code written in a language such as C++. The executable program code may be loaded into memory 1211 and its instructions executed by processor 1212. The instructions of such executables and code libraries, which correspond with instructions necessary to perform abstraction, may be stored to a disk 1218, such as a floppy drive, hard drive or CD drive 1217, or memory 1211.

The various inputs/outputs such as the device-specific ID information, the Software Product ID, the Production Key and other such information may be written to/accessed from disk 1218, optical drive 1217 or even via network 1200 in the form of flat files or downloaded directly by or into any program for which such information may be needed. Device-specific ID may be read directly from the device such as NIC device 1216 via an operating system which may be running in memory 1211. Further, LPI Code which is generated by the LPI code library may be written to the EEPROM or other memory of NIC device 1216 through such an operating system or environment.

Computer system 1210 has a system bus 1213 which facilitates information transfer to/from the processor 1212 and memory 1211 and a bridge 1214 which couples to an I/O bus 1215. I/O bus 1215 connects various I/O devices such as a network interface card (NIC) 1216, disk 1218 and optical drive 1217 to the system memory 1211 and processor 1212. Many such combinations of I/O devices, buses and bridges can be utilized with the invention and the combination shown is merely illustrative of one such possible combination.

The manufacturer of the user software embeds therein a Private Key and a Software Product ID. The software manufacturer also provides a Production Key to the manufacturer of the device associated with the user software. Using this Production Key, an LPI code is burned into the device being manufactured (for instance NIC 1216). In at least one embodiment of the invention, user software is loaded into a host such as computer system 1210 and placed into a validation mode. The user software, while in validation mode, has program code for performing basic MAC validation and Private Key validation loaded into memory 12111 so that its instructions can be executed by processor 1212. The NIC device 1216, which will utilize the user software, is installed in the computer system 1210 (by coupling it, for instance, I/O bus 1215).

In the case of NIC device 1216, the user software will first perform basic MAC address validation, and then access the LPI burned into NIC card 1216 to extract its Private Key. This extracted Private Key is compared to the embedded Private Key in the user software. If there is a match, then the user software is fully enabled (or enabled with those features indicated by the Software Product ID) for use in computer system 1210.

Although the present invention has been described in detail with reference to the disclosed embodiments thereof, those skilled in the art will appreciate that various substitutions and modifications can be made to the examples described herein while remaining within the spirit and scope of the invention as defined in the appended claims.

For instance, the device ID information may include the fields other than those described above or be fewer or greater in number as desired. The sizes of the fields, words, keys and codes are merely exemplary and can be designed/specified as needed. Further, devices other than those with a MAC address may still utilize the protection scheme by making modifications thereto, as needed.

What is claimed is:

1. A method of generating a secure program interface for software intended to be used with predetermined hardware comprising the steps of
providing as a first input at least one device specific identifier,
providing as a second input one software specific identifier, and
generating as an output a production key adapted to be operatively associated with the software;
wherein the at least one device specific identifier includes at least two device specific identifiers selected consisting of MAC address, chipset ID, vendor ID, serial number, and address range;
wherein the same production key is used for a plurality of different ones of the hardware; and
wherein a unique copy of the software is associated with each of the plurality of different ones of the hardware.

2. The method of claim 1, wherein the at least one device specific identifier includes MAC address and at least one other device specific identifier.

3. The method of claim 1, wherein the at least one device specific identifier includes a unique serial number and at least one other device specific identifier.

4. The method of claim 1, wherein the at least one device specific identifier includes a chipset ID and at least one other device specific identifier.

5. The method of claim 1, wherein the at least one device specific identifier includes a chipset ID and at least one other device specific identifier.

6. The method of claim 1, wherein the at least one device specific identifier includes a vendor ID and at least one other device specific identifier.

7. The method of claim 1, wherein the at least one device specific identifier includes an address range and at least one other device specific identifier.

* * * * *